United States Patent [19]

Hoehn, Jr.

[11] Patent Number: 4,465,140
[45] Date of Patent: Aug. 14, 1984

[54] METHOD FOR THE MAGNETIZATION OF WELL CASING

[75] Inventor: Gustave L. Hoehn, Jr., Dallas, Tex.

[73] Assignee: Mobil Oil Corporation, New York, N.Y.

[21] Appl. No.: 426,028

[22] Filed: Sep. 28, 1982

[51] Int. Cl.³ .................... E21B 19/00; E21B 41/00
[52] U.S. Cl. ............................. 166/381; 166/65 M; 166/250; 324/346
[58] Field of Search ............... 324/346, 221; 166/250, 166/254, 255, 381, 65 M

[56] References Cited

U.S. PATENT DOCUMENTS

| | | | |
|---|---|---|---|
| 2,259,904 | 10/1941 | McNamee | 324/346 |
| 3,114,876 | 12/1963 | Schuster | 324/34 |
| 3,277,363 | 10/1966 | Schuster | 324/221 |
| 4,224,989 | 9/1980 | Blount | 166/250 |
| 4,372,398 | 2/1983 | Kuckes | 324/346 X |

FOREIGN PATENT DOCUMENTS 983704 2/1976 Canada.

OTHER PUBLICATIONS

*Journal of Petroleum Technology*, Jun. 1972, p. 741, Magnetostatic Methods for Estimating Distance and Direction from a Relief Well to a Cased Wellbore, J. D. Robinson et al., see FIG. 1.

*Primary Examiner*—Stephen J. Novosad
*Assistant Examiner*—Timothy David Hovis
*Attorney, Agent, or Firm*—Alexander J. McKillop; Michael G. Gilman; Charles J. Speciale

[57] ABSTRACT

A well casing is magnetized by traversing an internal magnetizer along and within the well casing while periodically reversing the direction of the magnetic field of the magnetizer to create a plurality of magnetic flux leakage points along the well casing.

7 Claims, 3 Drawing Figures

METHOD FOR THE MAGNETIZATION OF WELL CASING

BACKGROUND OF THE INVENTION

The borehole of producing oil and gas wells is typically lined from top to bottom with steel casing anchored by a sheath of cement that is securely and circumferentially bonded to both the casing and the wall of the wellbore. Offshore wells are sometimes abandoned with no equipment projecting above the water surface. Oftentimes wells are drilled at extreme depths with the drilled wellbore deviating sustantially from the vertical. There is, therefore, the need for a reliable method of locating the wellhead of such abandoned offshore wells or for locating the bottom of a deviated well, especially in the case of a well blowout when a relief well is to be drilled to intersect the deviated well at a point above or near the blowout. Other similar situations may arise when the exact location of the wellhead or well bottom is needed.

One of the methods that has been used in such well location efforts is by searching with a magnetometer for the magnetic anomaly created by the well casing. The natural magnetization of a well casing due to the earth's magnetic field produces an anomaly in the total magnetic field which may be detected with a sensitive magnetometer at distances up to a few hundred feet. The magnitude of the anomaly is proportional to the end steel area of the casing, the vertical component of the earth's field, the effective permeability, and is inversely proportional to the square of the distance from the wellhead or well bottom. However, the vertical component of the earth's magnetic field goes to zero at the magnetic equator. Thus, the reduced anomaly over about twenty percent of the earth's surface is difficult to impossible to detect.

SUMMARY OF THE INVENTION

In accordance with the present invention there is provided a method for magnetizing well casing by means of an internal magnetizer being advanced through the well casing to create a magnetic anomaly along such well casing. The direction of the magnetic field of the magnetizer travels through the well casing so as to create a plurality of magnetic flux leakage points along the well casing. The distance between the magnetic flux leakage points is such that a desired magnetic field strength is created along the well casing at a desired radial distance outward from the well casing. More particularly, the desired magnetic field strength is created at a radial distance outward from the well casing at least equal to the distance between the magnetic flux leakage points.

DESCRIPTION OF THE PREFERRED EMBODIMENT

Figure 1:
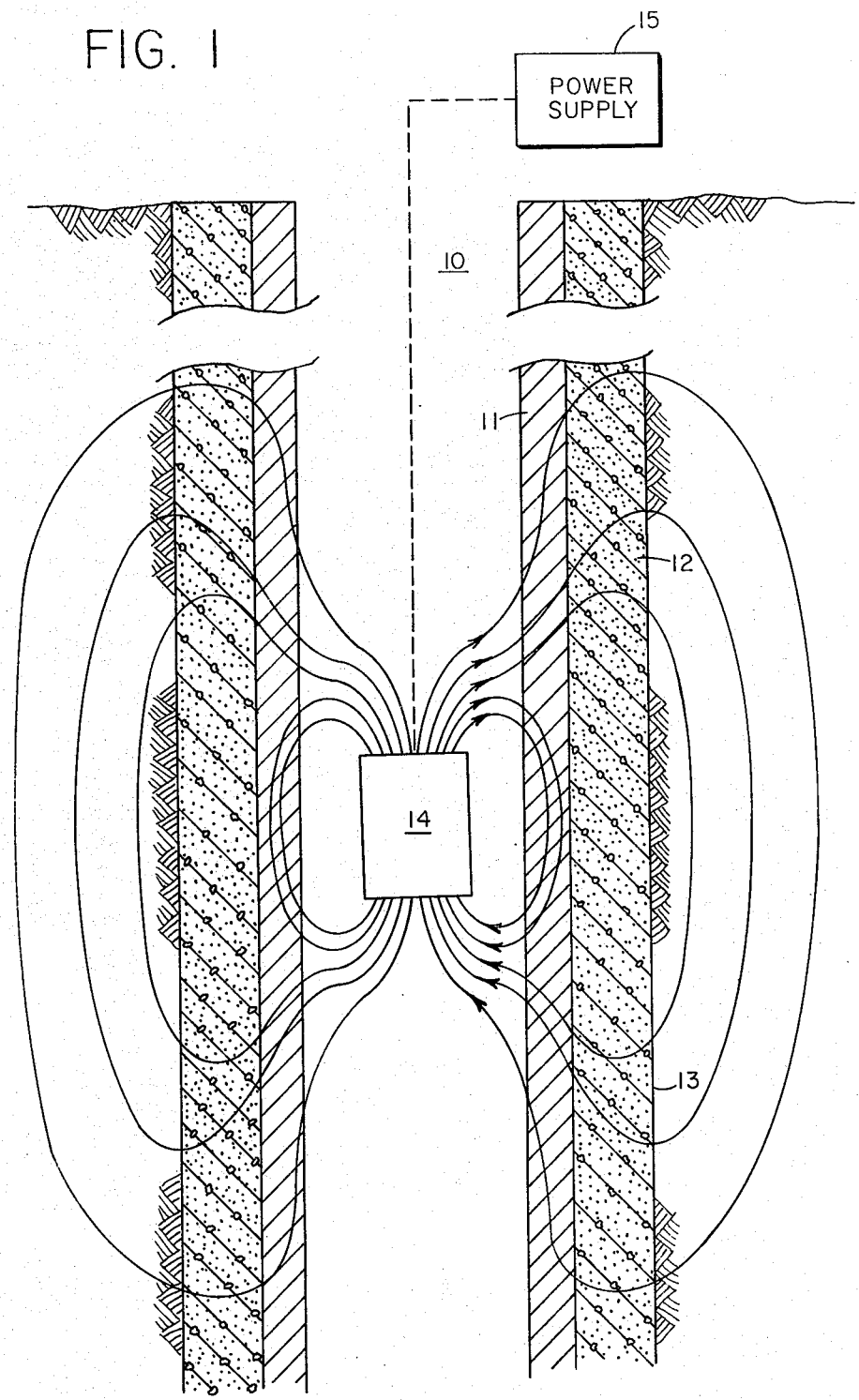
FIG. 1 illustrates a well casing being magnetized in accordance with the present invention.

A typical wellbore 10 is shown in FIG. 1 lined with steel casing 11 and anchored by a sheath of cement 12 which is circumferentially bonded to both the casing 11 and the wall of the wellbore 13. An internal magnetizer, shown schematically at 14, is lowered into the casing by means of a suitable wireline cable (not shown). The magnetizer core may preferably be of soft iron wound with a number of layers of copper wire. Power is supplied to the magnetizer from an uphole power supply 15. The power can be applied to the magnetizer continuously as a D.C. voltage or can be applied in unipolar pulses from a storage capacitor. When the polarity of the power to the magnetizer is reversed, a magnetic pole develops in the casing 11. By causing these reversals to occur at several feet or more along the casing 11, a magnetic anomaly is created in the casing which can be detected by a flux gate magnetometer or other type magnetometer in a nearby wellbore being drilled or in a relief well being drilled to intersect the wellbore 10 in the event of a well blowout. With the polarity shown in FIG. 1, the magnetization last "felt" by the casing 11 will be in the upward direction as the magnetizer 14 is advanced upward through the casing.

Figure 2:
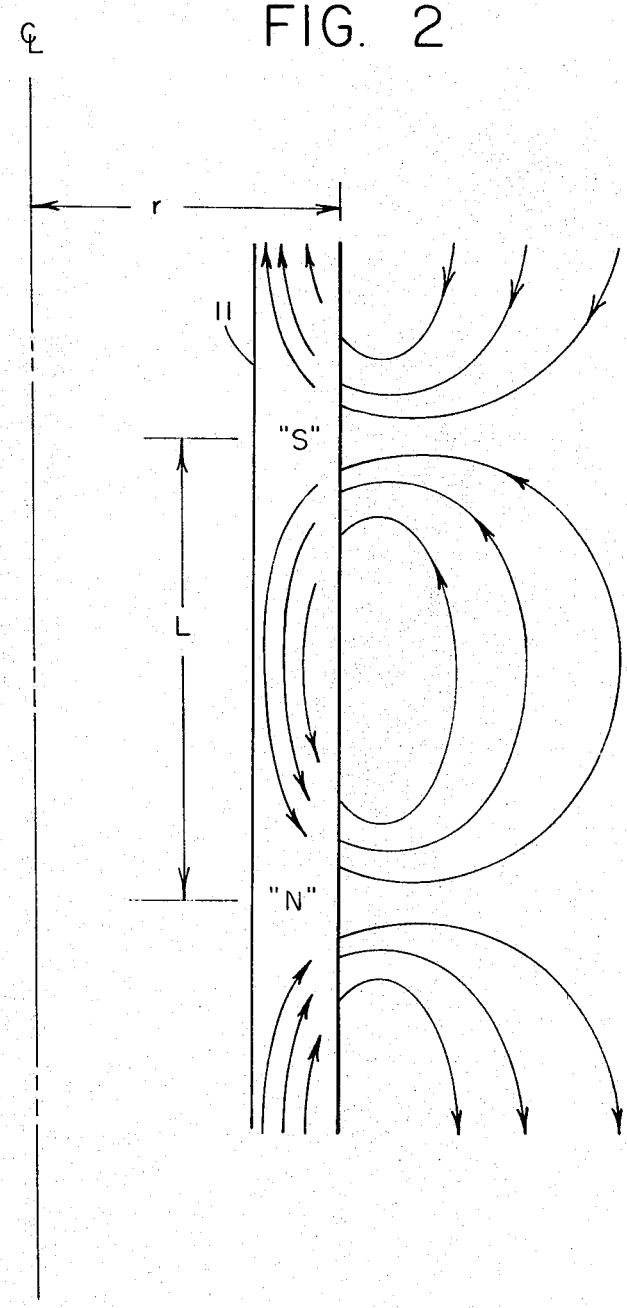
FIG. 2 illustrates the magnetic anomaly created by the magnetized well casing of FIG. 1.
Figure 3:
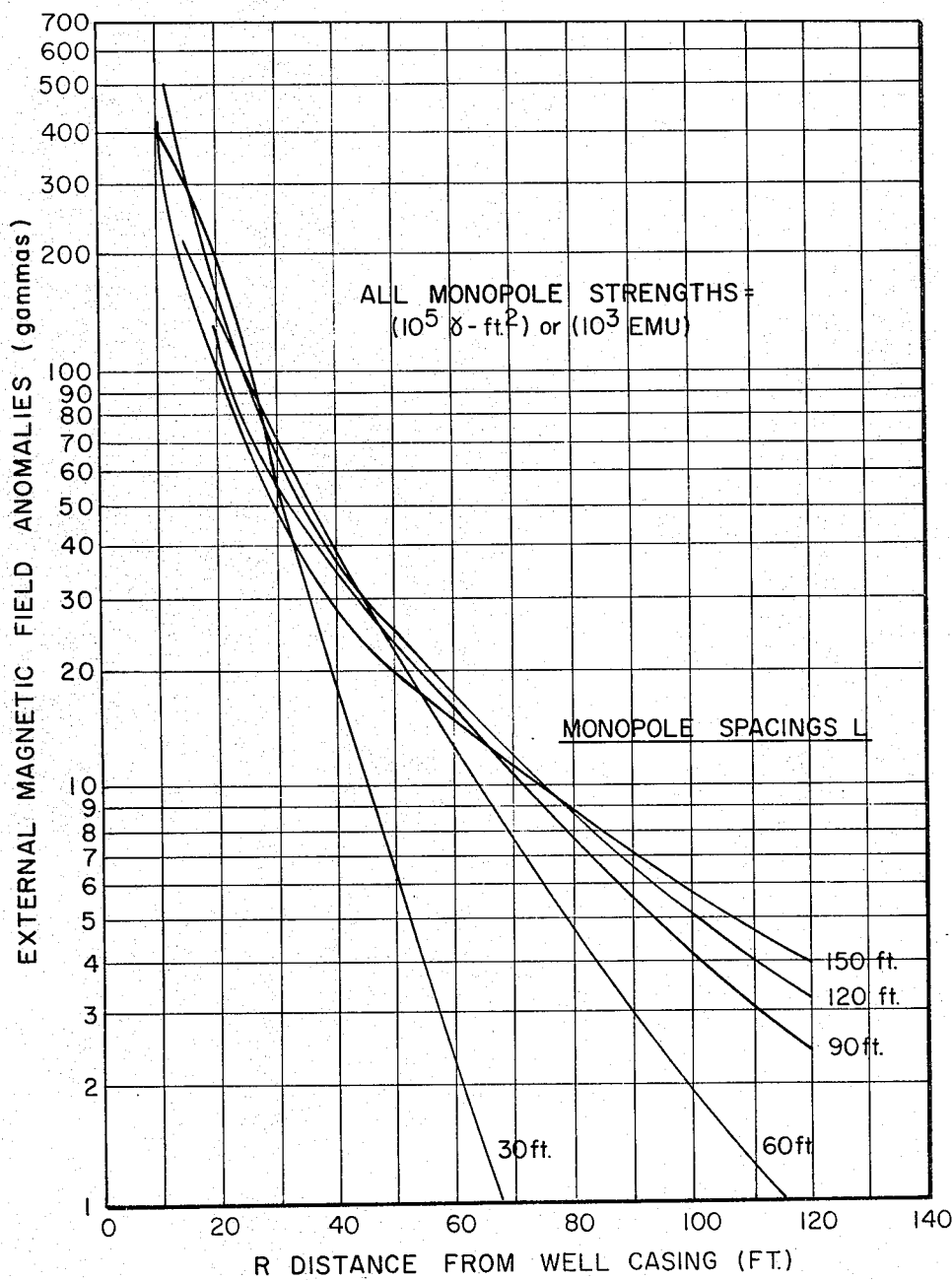
FIG. 3 illustrates the magnetic anomaly of the well casing of FIG. 1 as a function of distance into the formation surrounding the well casing.

More particularly, the anomaly created by the magnetization of the casing 11 may be as illustrated in FIG. 2 wherein a plurality of alternating N and S magnetic poles are spaced along the casing 11. The spacing L between such poles should be of sufficient distance to maximize the detection range of the casing from a relief well or other well into which a magnetometer is located. Although not to scale in FIG. 2, the monopole spacing L is much greater than the casing radius r. preferably the desired magnetic field strength is created at a radial distance outward from the well casing at least equal to the distance between the magnetic flux leakage points. FIG. 3 illustrates magnetic anomaly as a function of distance from the magnetized well casing for spaced magnetic monopoles of alternating polarity of 30 feet, 60 feet, 90 feet, 120 feet and 150 feet. It can be seen that as the spacing distance L between the monopoles is increased, the distance of detection of the anomaly from the well casing is increased. This is due to the fall of the magnetic field strength at the rate of $1/R^2$ where R is the distance from the magnetometer in the relief or other wellbore to the magnetized well casing 11 in the wellbore 10 for example.

In one embodiment, the internal magnetizer 14 was comprised of an 18 inch Armco soft iron core of 1¼ inch diameter with a two layer winding of #16 copper wire. A monopole magnetic pole strength of $1.8 \times 10^5 \alpha\text{-ft}^2$ (on $1.8 \times 10^3$ cmu) was produced with a 30 volt D.C. pulse supplied to the magnetizer from the capacitive discharge of the uphole power supply.

It is to be understood that the foregoing merely describes one embodiment of the present invention. Various modifications, as well as alternate embodiments, may become apparent to one skilled in the art without departing from the scope and spirit of the invention as hereinafter defined by the appended claims. For example, in lieu of magnetizing the well casing after it has been located and cemented in the wellbore, the casing could be magnetized on the earth's surface as it is being lowered into the wellbore. Also pulsed power may be utilized in magnetizing the casing in lieu of D.C. power.

I claim:

1. A method of magnetizing a well casing, comprising the steps of:

(a) moving a direct current magnetizing means relative to the well casing to create a magnetic anomaly along said casing, and (b) periodically reversing the direction of the magnetic field of said magnetizing means at each of a plurality of successive spaced points as said magnetizing means moves relative to said casing to create a plurality of spaced and alternating north and south monopoles defining a plurality of spaced magnetic flux leakage points in and along said casing.

2. The method of claim 1 wherein the distance between said magnetic flux leakage points is such that a desired magnetic field strength is created along said casing at a desired radial distance outward from said casing.

3. The method of claim 2 wherein said desired magnetic field strength is created at a radial distance outward from said casing at least equal to the distance between said magnetic flux leakage points.

4. The method of claim 1 wherein said magnetization of the well casing is carried out after the well casing has been set within the wellbore.

5. The method of claim 1 wherein said magnetization of the well casing is carried out as the well casing is being lowered into the wellbore.

6. The method of claim 1 wherein the spacing between alternating monopoles in said casing is greater than a radius of said casing.

7. The method of claim 1 wherein said magnetizing means moves through said well casing to create said magnetic anomaly.

* * * * *